United States Patent
Wedlake

(10) Patent No.: US 6,950,931 B2
(45) Date of Patent: Sep. 27, 2005

(54) SERVER CONFIGURATION USING PROFILE TEMPLATES

(75) Inventor: Martine B. Wedlake, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/063,969

(22) Filed: May 30, 2002

(65) Prior Publication Data

US 2003/0225867 A1 Dec. 4, 2003

(51) Int. Cl.$^7$ .............................................. G06F 15/177
(52) U.S. Cl. ......................................... 713/2; 713/100
(58) Field of Search ................................ 713/1, 2, 100

(56) References Cited

U.S. PATENT DOCUMENTS

| | | | | |
|---|---|---|---|---|
| 5,165,018 A | * | 11/1992 | Simor | ........................ 709/222 |
| 5,819,030 A | * | 10/1998 | Chen et al. | .................. 709/220 |
| 5,872,928 A | * | 2/1999 | Lewis et al. | ................. 709/222 |
| 6,449,715 B1 | * | 9/2002 | Krivoshein | ..................... 713/1 |
| 6,536,014 B1 | * | 3/2003 | McClannahan et al. | ......... 716/1 |
| 6,672,505 B1 | * | 1/2004 | Steinmetz et al. | ........... 235/379 |
| 2002/0112038 A1 | * | 8/2002 | Hessmer | |

* cited by examiner

Primary Examiner—Thomas Lee
Assistant Examiner—Vincent Tran
(74) Attorney, Agent, or Firm—Abdy Raissinia

(57) ABSTRACT

The configuration of servers using profile templates is disclosed. A profile template for configuring one or more servers is loaded. The profile template includes abstracted server configuration parameters and server configuration rules, and can be abstracted from parent profile templates. The parameters are for abstractly configuring a server type of which the servers are, whereas the rules specify how values of the parameters translate to direct server values for directly configuring the servers, based on attributes of the servers. A user is requested to modify preset of the parameters, and/or enter missing values of the parameters. Finally, a configuration for each server is generated as the values of the parameters, and the server configuration rules.

16 Claims, 5 Drawing Sheets

SERVER CONFIGURATION USING PROFILE TEMPLATES

BACKGROUND OF INVENTION

This invention relates generally to servers, such as database servers and other types of servers, and more particularly to the configuration of such servers.

Computer servers have become a mainstay in information technology (IT) environments. Generally, a server is a computer that is shared by multiple users. Servers can include file servers, for storing the data files of multiple users, database servers, for storing databases accessible by multiple users, web servers, for storing web pages accessible by multiple users over the Internet, as well as other types of servers. Large organizations may have tens, hundreds, or even more servers in their IT environments.

For usability, performance, security, and other reasons, servers must usually be appropriately configured prior to their first use, and reconfigured as the environments in which they operate change, and as they are updated with new hardware and/or software. Network administrators are typically expected to configure and otherwise maintain servers under their responsibility. As server technology has grown increasingly complex, the number of different configuration parameters that administrators are expected to track has correspondingly increased in size and complexity.

However, this increase in the size and complexity of server configuration parameters is reaching, if not having reached already, the point where it may be nearly impossible for a single or small group of network administrators to properly track such parameters. In response, automatic server configuration utilities are becoming more commonplace. These utilities are usually in the form of wizards, which are instructional help utilities that guide the administrators through the steps necessary to properly accomplish server configuration.

However, for both hardware and software server manufacturers, the development of such utilities can be burdensome. Each wizard utility is typically specific to a given type of server, either from a hardware or a software perspective. Changes in the hardware or software of the server may thus necessitate a large programming effort to rework the utility. The end result may be that the manufacturers have to dedicate a large amount of resources to create such utilities, or decrease the number of server configuration parameters that can be set using such utilities.

For these described reasons, as well as other reasons, there is a need for the present invention.

SUMMARY OF INVENTION

The invention relates to the configuration of servers using profile templates. A first method of the invention includes loading a profile template for configuring one or more servers. The profile template includes abstracted server configuration parameters and server configuration rules. The parameters are for abstractly configuring a server type of which the servers are, whereas the rules specify how values of the parameters translate to direct server values for directly configuring the servers, based on attributes of the servers. A user is requested to modify preset of the parameters, and/or enter missing values of the parameters. Finally, a configuration for each server is generated as the values of the parameters, and the server configuration rules.

A second method of the invention subsequently loads such a configuration. The configuration includes values of abstracted configuration parameters for abstractly configuring a type of server, and server configuration rules. The server configuration rules of the configuration are applied to the values of the abstracted configuration parameters of the configuration, based on attributes of a server. This generates the direct server values for directly configuring the server. Thus, the server is configured based on the direct server values generated.

A system of the invention includes a configuration server and one or more servers. The configuration server stores configurations, including values of abstracted configuration parameters and server configuration rules. The rules specify how the values of the parameters translate to direct server values for direct server configuration. Each server correspondingly loads a configuration from the configuration server, and applies the rules to the values of the parameters based on its attributes, yielding direct server values that the server uses to configure itself.

An article of manufacture of the invention includes a computer-readable medium and means in the medium. The means in the medium is for loading a configuration including values of abstracted configuration parameters, and server configuration rules. The means is further for applying the server configuration rules to the values of the abstracted configuration parameters, based on server attributes, to generate direct server values. The means is finally for configuration a server based on the direct server values generated.

Other features and advantages of the invention will become apparent from the following detailed description of the presently preferred embodiment of the invention, taken in conjunction with the accompanying drawings.

BRIEF DESCRIPTION OF DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Overview: Preferred Method

Figure 1:
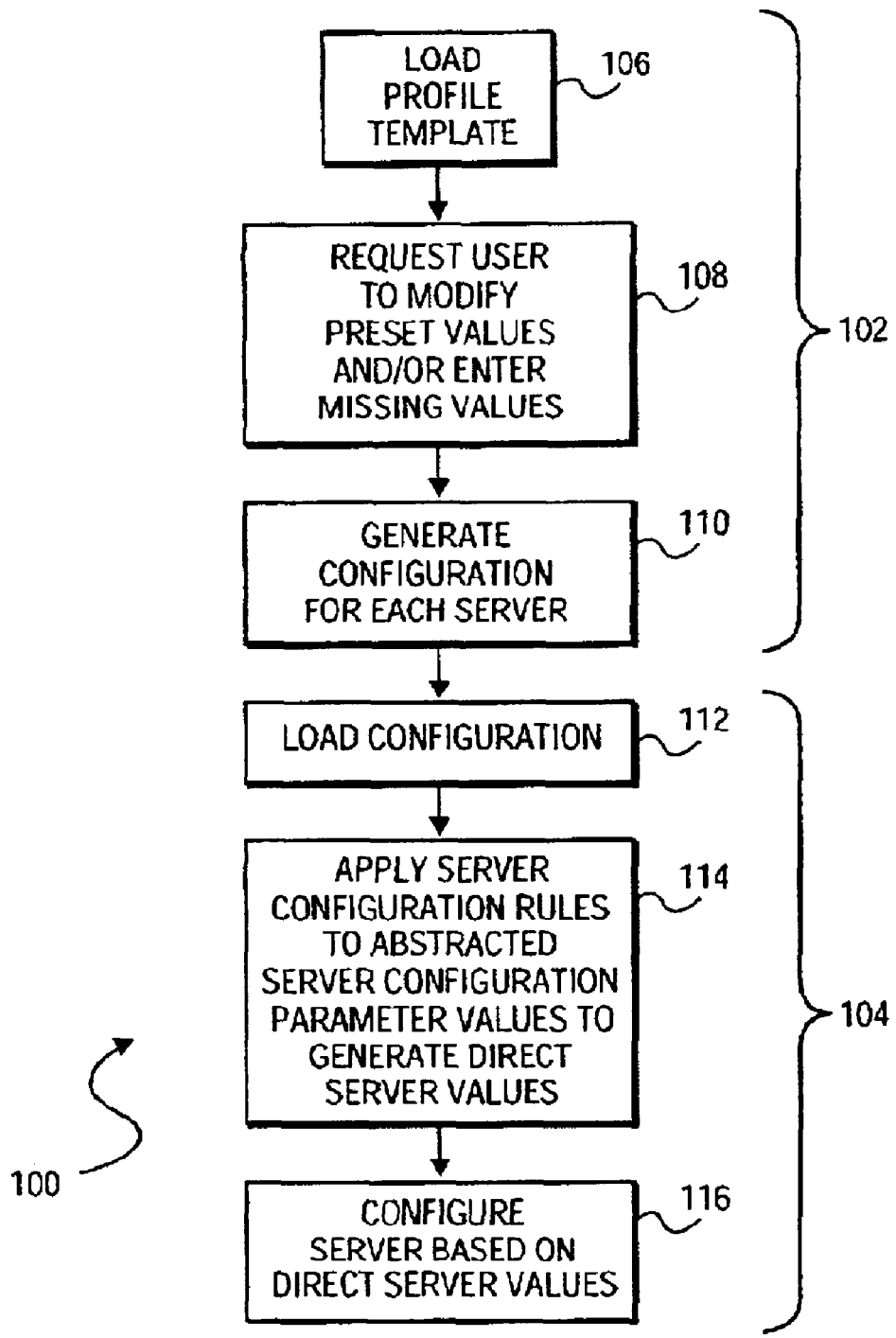
FIG. 1 is a flowchart of a method according to a preferred embodiment of the invention, and is suggested for printing on the first page of the patent.

FIG. 1 shows a method 100 according to a preferred embodiment of the invention. The method 100 is divided into two parts: a server configuration construction part 102, and a server configuration part 104. The part 102 of the method 100 is preferably performed by a configuration server communicating with a client to allow user interaction. The part 104 of the method 100 is preferably performed by each server, to configure itself based on the configuration constructed by the part 102. Furthermore, the method 100 may be implemented as a computer program stored on a computer-readable medium of an article of manufacture and that has corresponding means. The medium may be a recordable data storage medium, a modulated carrier signal, or another type of medium.

With respect to the part 102 of the method 100, a profile template is initially loaded (106). The profile template includes abstracted server configuration parameters, as well as server configuration rules. The abstracted server configuration parameters are for abstractly configuring a server type, of which the servers that will individually perform the part 104 of the method 100 are. These parameters are high-level parameters, which preferably do not specifically map to individual and directly set parameters of the servers, values for which are referred to as direct server values to avoid confusion. The abstracted server configuration parameters may include a number of static direct server values, though, which remain constant regardless of a server's attributes.

As an example, the abstracted server configuration parameters may include parameters regarding the resource utilization of the servers, the load balancing requirements of the servers, and so on. More specifically, they may include such parameters as percentage of server resources, percentage of online transaction processing (OLTP) to be performed by the server, and so on. The collection of abstracted server configuration parameters preferably constitute a usage model of a given server's configuration, providing a high-level view as to how the server is to perform.

The server configuration rules then specify how values of the abstracted configuration parameters translate to the direct server values for directly configuring the servers, based on the servers' attributes. Thus, the server configuration rules map the abstracted server configuration parameters to concrete, direct server values that are directly used to configure the servers. Because the rules perform this mapping based on attributes of the servers, they are applied to the server configuration rules at boot time of each server. The attributes may include the processing speed of a server, the memory of a server, the storage of a server, and so on.

The profile template loaded is preferably not a complete configuration, but rather a configuration skeleton that may provide only a subset of the needed data to configure a server, whereas a given server configuration needs to define all such data. Therefore, the user is requested (108) to modify any preset values of the abstract server configuration parameters, and/or enter any missing values of the parameters. A given profile template may be for high-performance OLTP servers, for instance, and as such may specify preset values for the parameters that the user may modify. The template may also have missing, or blank values, for other parameters that the user must enter to create a server configuration. Preferably, 108 of the method 100 is performed by the user at a client interacting with the configuration server.

The profile template may itself be hierarchically related to one or more parent profile templates, from which it initially inherits some of the abstracted parameters and configuration rules that are then modified, deleted, or supplemented by the template. For example, there may be a baseline OLTP server profile template, on which a high-performance OLTP server profile template is based. The latter template inherits some of its abstracted parameters and configuration rules from the former template, which are then modified, deleted, or supplemented as necessary.

Once any missing values of the abstracted server configuration parameters have been entered, and the user has modified any preset values as desired, the configuration server generates a configuration for each of the servers (110). The configuration for each server includes the values of the abstracted server configuration parameters, including the values entered or modified by the user, and the server configuration rules. Preferably, the configurations for the servers are stored at the configuration server itself. In one embodiment, 110 is alternatively performed within the part 104, preferably when booting, rather than within the part 102, so that a server can be reconfigured based on changes made to the server profile without the user having to explicitly initiate 110.

With respect to the part 104 of the method 100, each server loads its configuration (112). The configuration may be loaded when booting, or at other times as well, including when a significant event occurs, such as a hardware fault or the reconfiguration of a resource. Where the configuration is stored at the configuration server, a server thus requests and receives its configuration from the configurations server. The server then applies the server configuration rules of the configuration to the abstracted server configuration parameter values of the configuration (114), based on the server's attributes. This enables the server to generate direct server values by which it can be configured. The server then configures itself using these direct server values (116).

For instance, the abstracted server configuration parameters may specify how the user, such as an administrator, wishes a collection of servers to perform. Each server then loads its configuration and applies the server configuration rules to the values of these parameters to determine exactly how it should configure itself in light of these parameters and the server's attributes. The direct server values thus are the specific and concrete parameters of the servers by which the servers configure themselves. The user does not have to set or track these values him or herself, but rather only has to specify the more abstract, high-level server configuration parameters.

Background Technology: Example System

Figure 2:
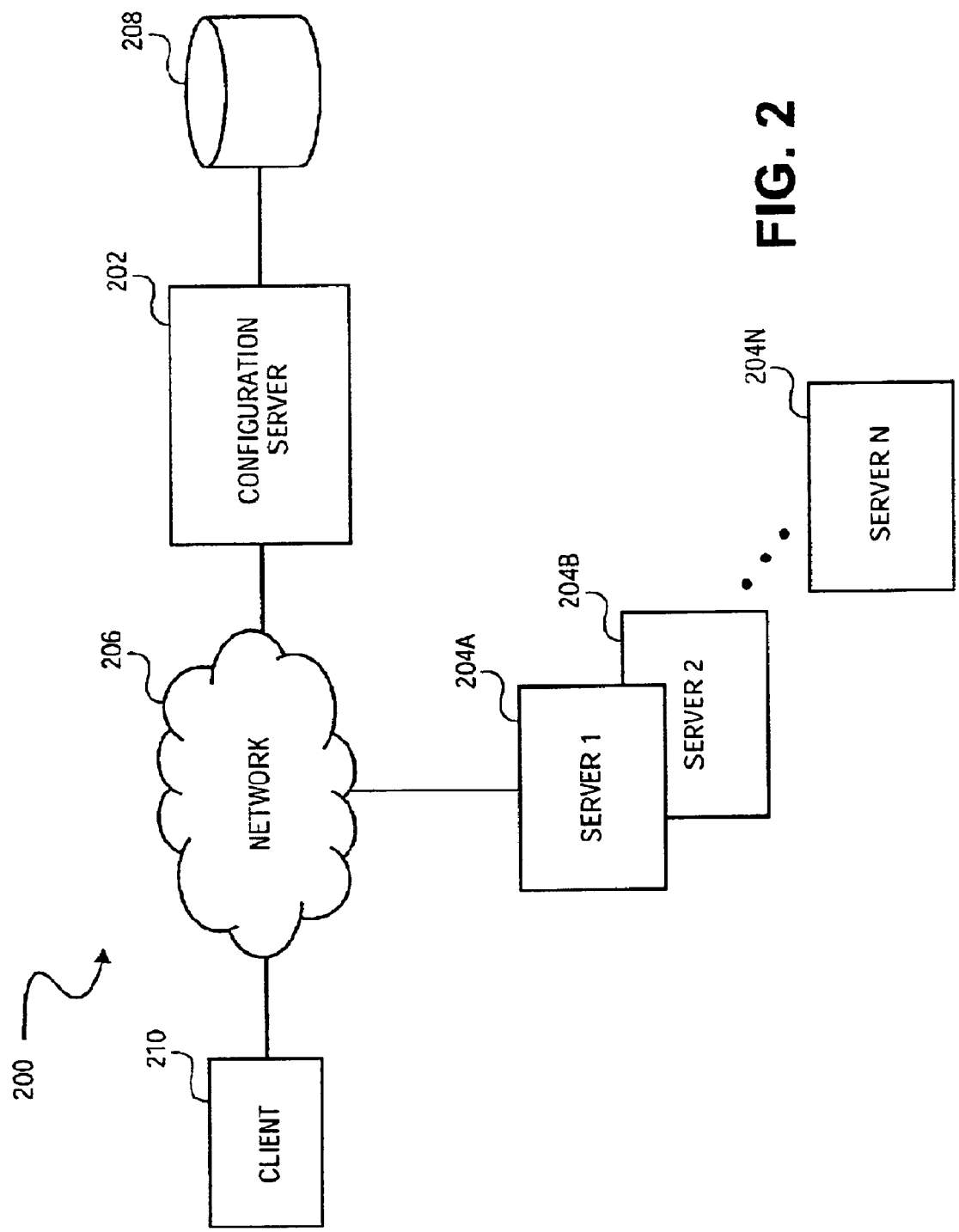
FIG. 2 is a diagram of a system in accordance with which embodiments of the invention may be practiced.

FIG. 2 shows a system 200 in conjunction with which embodiments of the invention can be implemented. A configuration server 202 is communicatively coupled to a network 206, to which servers 204A, 204B, . . . , 204N are also communicatively coupled. A client 210 is communicatively coupled to the network 206 as well. The network 206 may be one or more of a local-area network (LAN), a wide-area network (WAN), a wired network, a wireless network, an intranet, an extranet, the Internet, an Ethernet network, as well as other types of networks. The servers 204A, 204B, . . . , 204N are collectively referred to as the servers 204.

The configuration server 202 has an internal or external storage 208, on which the server 202 stores the profile templates for constructing the configurations for the servers 204, and also preferably stores the configurations themselves for the servers 204. User interaction is preferably involved for constructing the profile templates and the configurations. This may be accomplished by the user communicating directly with the client 210, which communicates with the configuration server 202 over the network 206. Similarly, when any of the servers 204 is booting or otherwise requires its configuration, it communicates with the configuration server 202 over the network 206.

Profile Template Construction via Inheritance

Profile templates are initially constructed prior to their use to construct specific configurations. The construction of a profile template may be included as an initial part of the method 100 of FIG. 1, for instance. A profile template describes a kind of server, and does not describe a particular instance of a server. As has been described, a profile template includes abstracted server configuration parameters and server configuration rules. It may also include static direct server values.

Within the system 200 of FIG. 2, profile template construction is accomplished by a user at the client 210 interacting with the configuration server 202 over the network 206. The profile templates are stored on the storage 208. Furthermore, profile templates can preferably be extended using inheritance chaining. A high-performance OLTP profile template may itself, for instance, be based on and be an extension of a baseline OLTP profile template.

Figure 3:
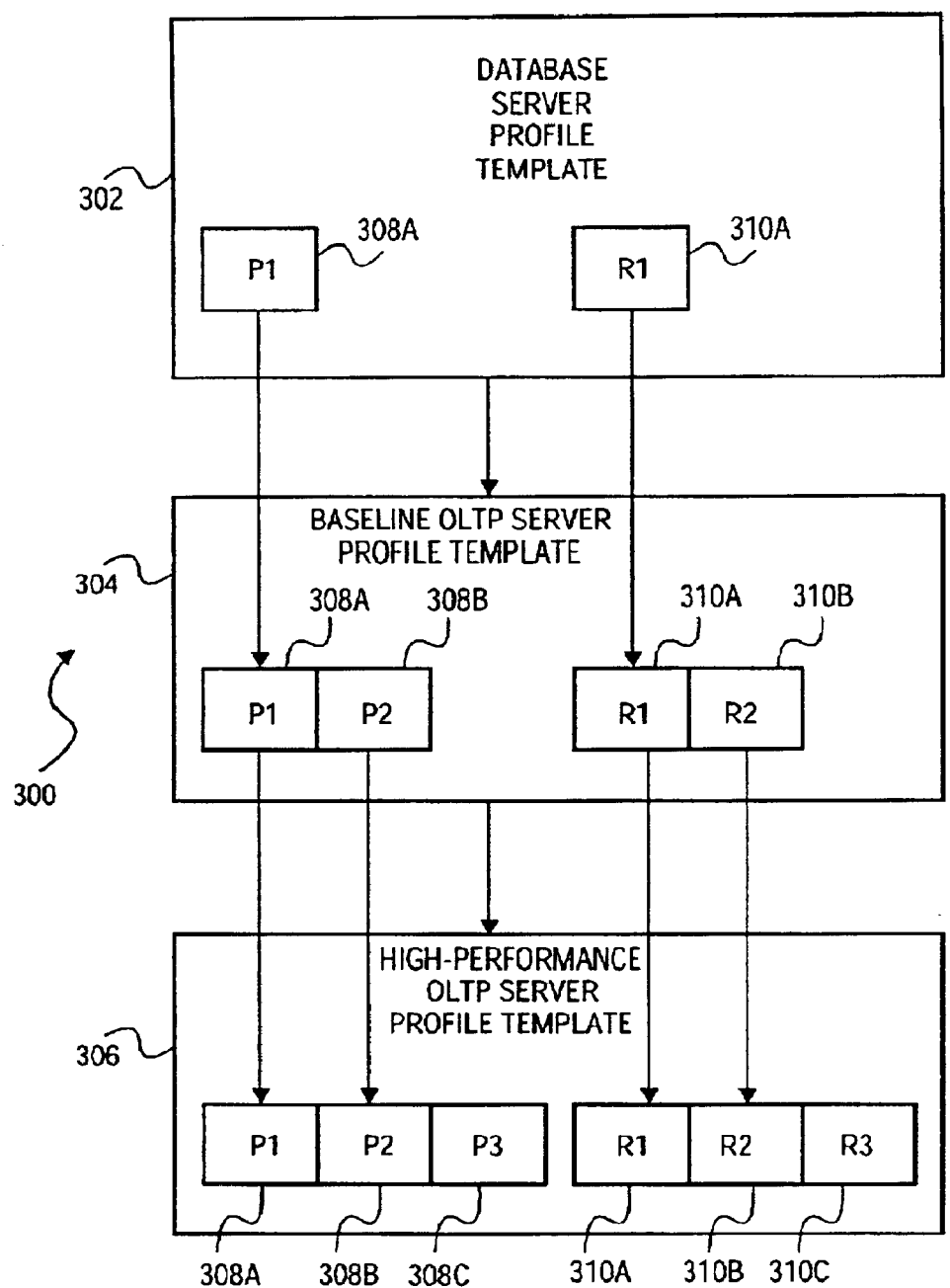
FIG. 3 is a diagram illustratively showing an example of how profile templates can inherit abstracted server configuration parameters and server configuration rules from parent profile templates, according to an embodiment of the invention.

The diagram 300 of FIG. 3 shows illustratively an example of profile template inheritance. The database server profile template 302 is the parent template to the baseline OLTP server profile template 304, which in turn is the parent template to the high-performance OLTP server profile template 306. Therefore, the abstracted server configuration parameters and the server configuration rules of the template 302 are inherited by the template 304. Similarly, the parameters and the rules of the template 304 are inherited by the template 306.

More specifically, the template 302 includes the abstracted server configuration parameters 308A and the server configuration rules 310A. Therefore, the template 304 inherits the parameters 308A and the rules 310A from the template 302, and also adds the parameters 308B and the rules 310B. Similarly, the template 306 inherits the parameters 308A and 308B from the template 304, as well as the rules 310A and 310B from the template 304. Added to the template 306 are the parameters 308C and the rules 310C.

Configuration Construction from Profile Template

Once a profile template has been constructed, specific server configurations are constructed using the profile template. The construction of server configurations is indicated as the part 102 of the method 100 of FIG. 1, for instance. A configuration is specific to a given server, and includes values for the abstracted server configuration parameters of the profile template, and server configuration rules of the template. It may also include static direct server values. Within the system 200 of FIG. 2, server configuration construction is again accomplished by a user at the client 210 interacting with the configuration server 202 over the network 206. The configurations are themselves also stored on the storage 208.

Figure 4:
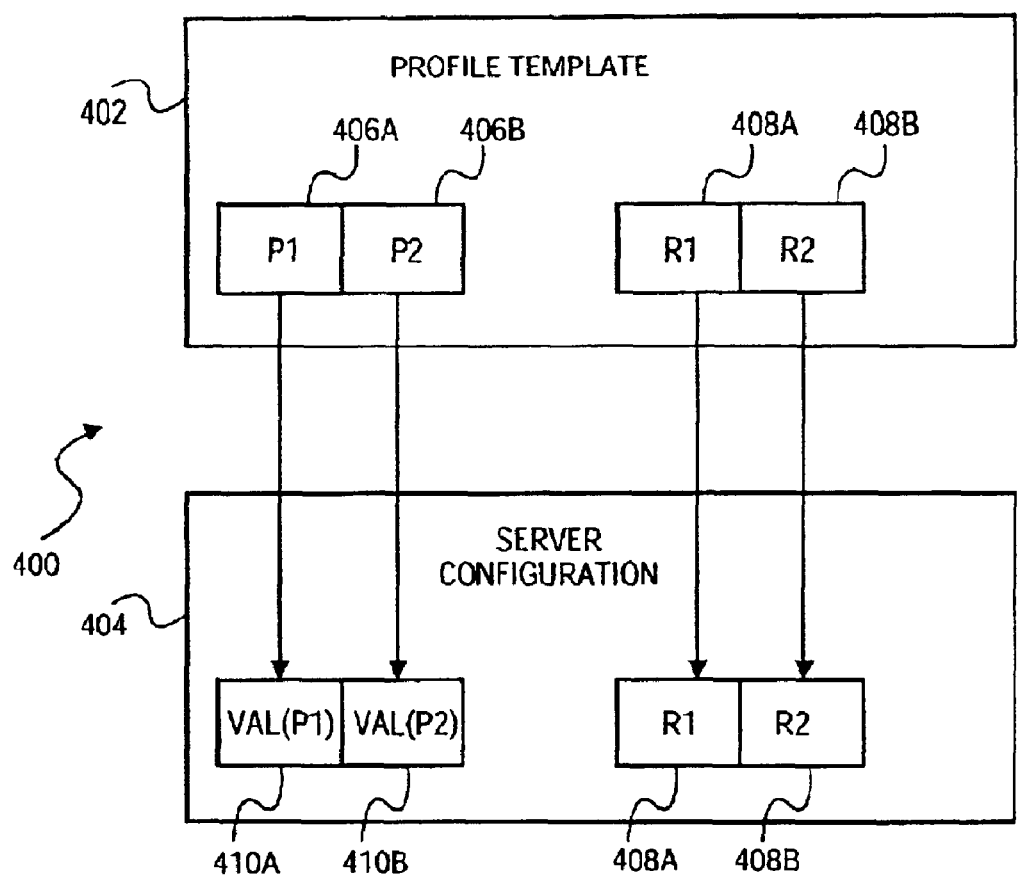
FIG. 4 is a diagram illustratively showing an example of how a server configuration can be constructed from a profile template, according to an embodiment of the invention.

The diagram 400 of FIG. 4 shows illustratively an example of server configuration construction from a profile template. The server configuration 404 is constructed from the profile template 402. The profile template 402 has abstracted configuration server parameters 406A and 406B, as well as server configuration rules 408A and 408B. The user, such as an administrator, sets values 410A and 410B for these parameters 406A and 406B, respectively, and the values 410A and 410B are part of the server configuration 404. The rules 408A and 408B of the template 402 also become part of the server configuration 404.

Configuring Server Using Previously Constructed Configuration

Once a server configuration has been constructed, the server for which the server configuration is meant can be configured, preferably at boot time, or at another time, such as when a significant event occurs. Configuring a server using a previously constructed configuration is indicated as the part 104 of the method 100 of FIG. 1, for instance. Configuring a server using a configuration involves applying the server configuration rules to the values of the abstracted server configuration parameters, based on the attributes of the server. This yields direct server values, which are values for parameters of the server that can be directly set. The configuration may also include static direct server values that are directly used to configure associated server parameters.

Within the system 200 of FIG. 2, configuring a server using a previously constructed server configuration is accomplished as follows. When one of the servers 204 needs to configure itself, such as when it is booting up, the server communicates with the configuration server 202 over the network 206 to receive its associated or corresponding previously constructed server configuration stored on the storage 208. The server then applies the server configuration rules of the configuration to the abstracted server configuration parameter values of the configuration, based on the server's attributes, to yield direct server values. The server configures itself based on these direct server values, by, for instance, storing these values at appropriate and corresponding parameters of itself.

Figure 5:
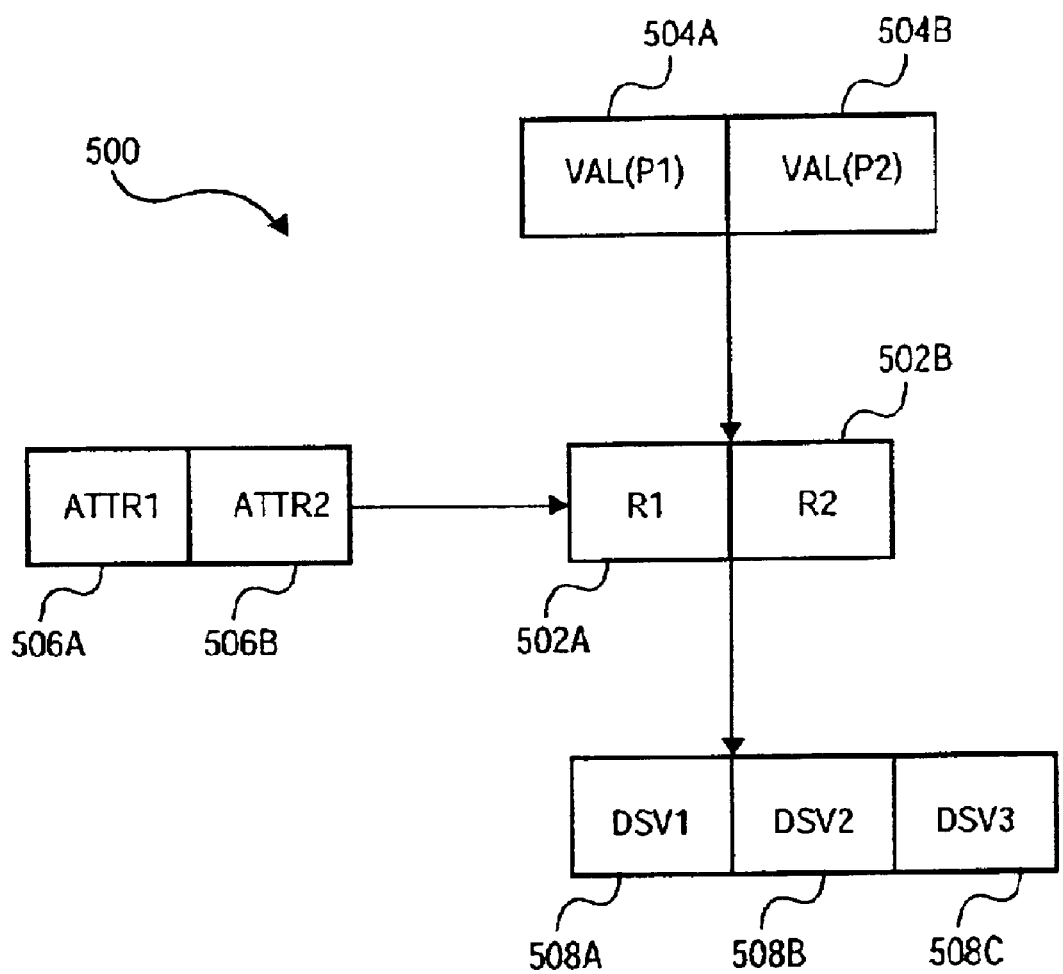
FIG. 5 is a diagram illustratively showing an example of how a server can be configured using a previously constructed server configuration, according to an embodiment of the invention.

The diagram 500 of FIG. 5 shows illustratively an example of configuring a server using a previously constructed server configuration. The configuration specifies server configuration rules 502A and 502B, as well as abstracted server configuration parameters 504A and 504B. The rules 502A and 502B are applied to the values 504A and 504B, based on the attributes 506A and 506B of the server to yield direct server values 508A, 508B, and 508C. These values 508A, 508B, and 508C are then used to configure the server.

Example Server Configuration

An example server configuration is next described. As may be appreciated by those of ordinary skill within the art, the example configuration described is for illustrative purposes only, and does not represent a limitation on the invention itself. The basic elements of the configuration can be described in general terms by the following grammar.

configuration::=serverId (configParam)*(configRule)*;
configParam::=paramId paramType value;
configRule::=ruleId target [paramsReqd]((configExpr)*| (configVector)*);
configExpr::=[condition]expression;
configVector::=[condition](configItem)*;
configItem::=metaRef item;

A server identifier serverId specifies a configuration as a set of abstracted server configuration parameter values configParam, and a set of server configuration rules configRule. Each configuration parameter value configParam is a name-value pair with a value for the type paramType, such as a string or a number. The parameter identifier paramId is used in the expression of rules, and is substituted at time of rule application or evaluation with the associated value.

Each configuration rule configRule has an identifier ruleId, a target that specifies the direct server values that will be generated based on any required parameters or attributes paramsReqd, and a collection of expressions configExpr or vectors configVector. Each expression or vector has a conditional clause that invokes the expression or vector only when it evaluates to true. This provides a cascaded if-then arrangement for the rules. A vector combines several direct server values configItem into a single structure, for ease of use. Expressions are represented as a common expression language with standard arithmetic operations, logic operations, and potentially specialty operations, such as minimum, maximum ceiling, floor, and so on.

Using this grammar, a sample server configuration is as follows.

configuration (serverId='exampleServer')
    configParam (paramId='Usage' paramType='string')
    value='Heavy'
    configParam (paramId='ServerName' paramType='string')
    value='exampleServer'
    configParam (paramId='StorageDir' paramType='string')
    value='/work/storageDirs/databases'
    configRule (ruleId=STORAGE)
    configExpr
    target=#config:STORAGE
    expression=composePath($StorageDir, 'rootdbs'+'.'+$ServerName)
    configRule (ruleId=TYPE)
    configExpr (condition=#/fmx-data/node/NodeName.eq. 'A-OS'.and.
      $Usage.eq. 'Heavy')
      target=#config:TYPE
      expression='MAX'
    configExpr (condition=#node/NodeName.eq. 'B-OS'.or. $Usage .eq. 'Medium')
      target=#config:TYPE
      expression='MED'
    configExpr (condition=#node/NodeName.eq. 'C-OS'.or. $Usage.eq. 'Light'
      target=#config:TYPE
      expression='MIN'

In this example, two direct server values are being set, storage and type. The storage direct server value shows how the expression capability can be used to combine multiple abstracted server parameters into a single result. The type direct server value shows how the conditional expression capability can be used to have a series of rules that can adapt to various attribute values. Thus, the parameter Usage and attribute node NodeName are evaluated to set the type of server to MAX, MED, or MIN. Parameters are indicated by the indicator $, whereas attributes are indicated by the indicator #.

Advantages over the Prior Art

Embodiments of the invention allow for advantages over the prior art. Profile templates may be constructed, preferably by using previously constructed profile templates to inherit baseline abstracted parameters and configuration rules. Specific instances of server configurations may then be constructed from the profile templates, where a configuration is interpreted at server boot time, or at another time when the configuration is loaded, to particularly configure a server based on its attributes.

An administrator does not, therefore, have to manually track all the direct server values that proper server configuration may require setting. Rather, the administrator only has to manipulate values for the abstracted parameters. At boot time or at another time when the configuration is loaded, the server configuration rules are applied to the parameters based on the server's attributes to generate appropriate direct server values. The administrator thus accomplishes server configuration at a high level.

Furthermore, a developer does not have to manually construct a utility to assist the user in setting the direct server values. The developer may only have to construct new profile templates, which themselves are preferably based on previously constructed profile templates so that redundant effort is avoided. The developer thus avoids having to code utilities, and instead only has to create those parts of new profile templates that vary from already existing profile templates.

Alternative Embodiments

It will be appreciated that, although specific embodiments of the invention have been described herein for purposes of illustration, various modifications may be made without departing from the spirit and scope of the invention. For instance, the invention has been described within the context of a system topology that includes a configuration server, a number of servers to be configured based on configurations stored on the configuration server, and a client for constructing these configurations in interaction with the configuration server. However, other system topologies are also amenable to the invention. Accordingly, the scope of protection of this invention is limited only by the following claims and their equivalents.

What is claimed is:

1. A computer implemented method comprising:
loading a profile template for configuring one or more servers, the profile template including abstracted server configuration parameters for abstractly configuring a server type of which the one or more servers are, and server configuration rules specifying how values of the abstracted configuration parameters translate to direct server values for directly configuring the one or more servers based on attributes of the one or more servers; requesting a user to at least one of modify preset values of the values of the abstracted server configuration parameters and enter missing values of the values of the abstracted server configuration parameters; and, generating a configuration for each of the one or more servers as the values of the abstracted server configuration parameters and the server configuration rules;
wherein loading the profile template comprises loading one or more parent profile templates from which the profile template inherits one or more of the abstracted server configuration parameters and one or more of the server configuration rules of the profile template.

2. The method of claim 1, further initially comprising constructing the profile template.

3. The method of claim 2, wherein constructing the profile template comprises determining one or more of the abstracted server configuration parameters and one or more of the server configuration rules of the profile template.

4. The method of claim 2, wherein constructing the profile template comprises selecting one or more parent profile templates from which the profile template inherits one or more of the abstracted server configuration parameters and one or more of the server configuration rules of the profile template.

5. The method of claim 1, wherein generating the configuration for each of the one or more servers comprises generating the configuration as the values of the abstracted server configuration parameters, the server configuration rules, and one or more static direct server values of the direct server values that remain constant regardless of the attributes of the one or more servers.

6. A computer implemented method comprising:
loading a configuration including values of abstracted configuration parameters for abstractly configuring a server type of which a server is, and server configuration rules specifying how the values of the abstracted server configuration parameters translate to direct server values for directly configuring the server based on attributes of the server; applying the server configuration rules to the values of the abstracted configuration parameters based on the attributes of the server to generate the direct server values for directly configuring the server; and, configuring the server based on the direct server values generated;

wherein loading a configuration including loading values of abstracted configuration parameters from one or more parent profile templates from which the profile template inherits one or more of the abstracted server configuration parameters and one or more of the server configuration rules of the profile template.

7. The method of claim 6, wherein loading the configuration comprises loading the configuration including the values of the abstracted configuration parameters, the server configuration rules, and one or more static direct server values of the direct server values that remain constant regardless of the attributes of the server.

8. The method of claim 7, wherein configuring the server based on the direct server values generated comprises configuring the server based on the direct server values generated and the one or more static direct server values of the direct server values loaded.

9. The method of claim 6, wherein the method is performed by the server during one of booting, a hardware fault, and a resource reconfiguration.

10. A computer system comprising:
a configuration server storing configurations including values of abstracted configuration parameters and server configuration rules specifying how the values of the abstracted server configuration parameters translate to direct server values for direct server configuration', and, one or more servers, each server correspondingly loading a configuration from the configuration server, applying the server configuration rules to the values of the abstracted configuration parameters based on attributes of the server to yield the direct server values, and configuring itself based on the direct server values;

wherein the profile template inherits one or more of the abstracted server configuration parameters and one or more of the server configuration rules of the profile template from one or more parent profile templates, the configuration server storing the profile template and the one or more parent profile templates.

11. The system of claim 10, further comprising a configuration client by which a user generates the configurations from a profile template, the profile including the abstracted configuration parameters and the server configuration rules, the user at least one of modifying preset values of the values of the abstracted server configuration parameters and entering missing values of the values of the abstracted server configuration parameters.

12. The system of claim 10, wherein the configuration correspondingly loaded by each server includes one or more static direct server values of the direct server values that remain constant regardless of the attributes of the server.

13. The system of claim 12, wherein each server configures itself based on the direct server values including the one or more static direct server values.

14. An article of manufacture comprising:
a computer-readable storage medium; and,
means in the storage medium for loading a configuration including values of abstracted configuration parameters and server configuration rules specifying how the values of the abstracted server configuration parameters translate to direct server values based on server attributes, for applying the server configuration rules to the values of the abstracted configuration parameters based on the server attributes to generate the direct server values, and for configuring a server based on the direct server values generated;

wherein loading a configuration including loading values of abstracted configuration parameters from one or more parent profile templates from which the profile template inherits one or more of the abstracted server configuration parameters and one or more of the server configuration rules of the profile template.

15. The article of claim 14, wherein the means loads the configuration including the values of the abstracted configuration parameters, the server configuration rules, and one or more static direct server values of the direct server values that remain constant regardless of the server attributes.

16. The article of claim 15, wherein the means configures the server based on the direct server values generated and the one or more static direct server values of the direct server values loaded.

* * * * *